United States Patent
Jeong et al.

(10) Patent No.: US 11,475,607 B2
(45) Date of Patent: Oct. 18, 2022

(54) RADIO COVERAGE MAP GENERATION

(71) Applicant: Telefonaktiebolaget LM Ericsson (publ), Stockholm (SE)

(72) Inventors: Jaeseong Jeong, Solna (SE); Martin Isaksson, Stockholm (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 135 days.

(21) Appl. No.: 16/770,736

(22) PCT Filed: Dec. 19, 2017

(86) PCT No.: PCT/EP2017/083581
§ 371 (c)(1),
(2) Date: Jun. 8, 2020

(87) PCT Pub. No.: WO2019/120487
PCT Pub. Date: Jun. 27, 2019

(65) Prior Publication Data
US 2020/0311985 A1 Oct. 1, 2020

(51) Int. Cl.
*G06T 11/00* (2006.01)
*H04W 16/18* (2009.01)
*G06N 3/02* (2006.01)

(52) U.S. Cl.
CPC .......... *G06T 11/00* (2013.01); *G06N 3/02* (2013.01); *H04W 16/18* (2013.01)

(58) Field of Classification Search
CPC ......... G06T 1/20; G06T 7/0002; G06N 20/00; G06N 3/08; G06F 17/18
See application file for complete search history.

(56) References Cited

U.S. PATENT DOCUMENTS

| | | | |
|---|---|---|---|
| 2001/0045949 A1* | 11/2001 | Chithambaram | G01C 21/20 345/418 |
| 2003/0200228 A1* | 10/2003 | White | G01C 21/32 |
| 2009/0036143 A1* | 2/2009 | Martin | H04W 24/00 455/456.2 |

(Continued)

FOREIGN PATENT DOCUMENTS

| | | | |
|---|---|---|---|
| WO | 2016001473 A1 | 1/2016 | |
| WO | WO-2016001473 A1 * | 1/2016 | ............. H04L 43/08 |

OTHER PUBLICATIONS

PCT International Search Report and Written Opinion, dated Aug. 23, 2018, for International Application PCT/EP2017/083581,11 pages.

(Continued)

*Primary Examiner* — Todd Buttram
(74) *Attorney, Agent, or Firm* — Sage Patent Group

(57) ABSTRACT

Embodiments of the disclosure provide methods, apparatus and computer programs for generating a radio coverage map. A method comprises: obtaining image data of a geographical area, the image data comprising: a representation of the environment in the geographical area; and an indication of one or more transmission point locations corresponding to the locations of one or more transmission points in a wireless communications network; and applying a generative model to the image data, to generate a radio coverage map of the geographical area.

20 Claims, 4 Drawing Sheets

(56) References Cited

U.S. PATENT DOCUMENTS

| | | | | |
|---|---|---|---|---|
| 2011/0122132 | A1* | 5/2011 | Kim | G06T 17/05 |
| | | | | 345/420 |
| 2014/0051467 | A1* | 2/2014 | Tan | H04W 72/0453 |
| | | | | 455/501 |
| 2014/0343840 | A1* | 11/2014 | Seo | G06T 19/006 |
| | | | | 701/436 |
| 2019/0059068 | A1* | 2/2019 | Neubauer | H04L 63/123 |
| 2019/0116506 | A1* | 4/2019 | Bendlin | H04W 64/003 |
| 2019/0147320 | A1* | 5/2019 | Mattyus | G06K 9/627 |
| | | | | 382/155 |
| 2020/0311985 | A1* | 10/2020 | Jeong | G06T 11/00 |

OTHER PUBLICATIONS

Souly Nasim et al., "Semi Supervised Semantic Segmentation Using Generative Adversarial Network", 2017 IEEE International Conference on Computer Vision (ICCV), Venice, Italy, Oct. 22, 2017, 9 pages.

Phillip Isola et al., "Image-to-Image Translation With Conditional Adversarial Networks", Berkeley AI Research (BAIR) Laboratory, UC Berkeley, Nov. 26, 2018, 17 pages.

Ian J. Goodfellow et.al., "Generative Adversarial Nets", Université de Montréal, Jun. 10, 2014, 9 pages.

Andrej Karpathy et al., "Generative Models", Jun. 16, 2016, 13 pages.

Phillip Isola et al., "Image-to-Image Translation With Conditional Adversarial Networks", {arxiv}, 2016.

* cited by examiner

RADIO COVERAGE MAP GENERATION

CROSS-REFERENCE TO RELATED APPLICATIONS

This application is a 35 U.S.C. § 371 national stage application for International Application No. PCT/EP2017/083581, entitled "RADIO COVERAGE MAP GENERATION", filed on Dec. 19, 2017, the disclosures and contents of which are hereby incorporated by reference in their entireties.

TECHNICAL FIELD

Embodiments of the present disclosure relate to the generation of radio coverage maps, such as may be used to determine the radio coverage of a wireless communication network in a geographical area.

BACKGROUND

A radio coverage map (also known as a coverage map, or a propagation map) typically refers to a map of a geographical area in which the radio signal strength received from one or more radio transmission points is illustrated. The radio signal strength at each location (e.g. within a particular pixel) may be indicated, for example, by a colour of the map at that location.

Such radio coverage maps may be utilized by network operators to assist in network planning, i.e. determining how to configure transmission points in a particular geographical area. The network operators may be able to determine appropriate locations at which to position transmission points, appropriate transmission powers or transmission frequencies associated with those transmission points. The radio coverage map may further indicate the presence of coverage holes in a particular geographical area (e.g., locations or areas in which radio signal strength is below an acceptable threshold). One or remedial actions may be taken on the basis of such information, such as configuring devices in or near such coverage holes to use relaying techniques in order to connect to the network, or configuring such devices to enter a sleep state and so avoid wasting power attempting to connect to the network.

Conventional methods used to generate radio coverage maps typically fall into two categories. In a first category, the radio signal strength is determined by a suitable device (e.g. a user equipment, UE) being physically moved between locations on the map and measuring the radio signal strength at each location. Thus the radio coverage indicated in the radio coverage map is based on measured data. In a second category, the radio signal strength is determined on the basis of radio propagation models. According to these methods, the radio coverage map is produced on the basis of the configuration of transmission points, using radio simulators that incorporate well-defined radio propagation and path-loss models.

Of course, it is also possible to combine the two approaches. For example, the radio signal strength at intermediate locations, between locations at which measurements were performed, may be determined by extrapolating from the measured data (e.g., using one or more models of radio propagation, etc).

One benefit of the second approach is reduced cost as compared to the first approach, as significant time and resources are required to measure the radio signal strength across a map. However, the first approach is likely to be more accurate, as it is difficult for radio propagation and path-loss models to account for the precise environment (e.g. the presence of buildings, trees, changing ground height, etc). Although those models can be adapted to account for the presence of buildings, trees, etc, this increases the computational complexity considerably.

An alternative method of generating radio coverage maps, which does not suffer from these disadvantages, is therefore desirable.

SUMMARY

According to a first aspect of the disclosure, there is provided a method of generating a radio coverage map. The method comprises: obtaining image data of a geographical area, the image data comprising: a representation of the environment in the geographical area; and an indication of one or more transmission point locations corresponding to the locations of one or more transmission points in a wireless communications network; and applying a generative model to the image data, to generate a radio coverage map of the geographical area.

A further aspect of the disclosure provides a computer program product, embodied on a non-transitory machine-readable medium, comprising instructions which are executable by processing circuitry to cause the processing circuitry to: obtain image data of a geographical area, the image data comprising: a representation of the environment in the geographical area; and an indication of one or more transmission point locations corresponding to the locations of one or more transmission points in a wireless communications network; and apply a generative model to the image data, to generate a radio coverage map of the geographical area.

Another aspect of the disclosure provides a radio coverage map generator, comprising processing circuitry and a machine-readable medium storing instructions which, when executed by the processing circuitry, cause the radio coverage map generator to obtain image data of a geographical area, the image data comprising: a representation of the environment in the geographical area; and an indication of one or more transmission point locations corresponding to the locations of one or more transmission points in a wireless communications network; and apply a generative model to the image data, to generate a radio coverage map of the geographical area.

Alternatively, the radio coverage map generator may be implemented or embodied in one or more processing modules. For example, radio coverage map generator may comprise a first module and a second module. The first module may be configured to obtain image data of a geographical area, the image data comprising: a representation of the environment in the geographical area; and an indication of one or more transmission point locations corresponding to the locations of one or more transmission points in a wireless communications network. The second module may be configured to apply a generative model to the image data, to generate a radio coverage map of the geographical area. In one embodiment, the processing modules are implemented purely in hardware. In another embodiments, the processing modules are implemented purely in software. In a yet further embodiment, the processing modules are implemented in a combination of hardware and software.

Embodiments of the disclosure provide a method for generating radio coverage maps which is faster and lower-cost than conventional methods in which the radio coverage maps are generated by measurement. Further, the claimed method can be expected to produce radio coverage maps which are more accurate than those produced by conventional methods based on radio propagation models.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The disclosure relates to a method for generating coverage maps using generative models, e.g. using deep-learning neural networks. Thus, rather than computing the radio signal strength for each unit area with conventional channel models, the disclosure provides a generative model which is configured to determine the radio propagation directly from input imaging data (having previously been trained via neural networks). In one embodiment, the disclosure provides a method of training a generative neural network (e.g., generative adversarial networks, GAN) that translates map image data including transmission points (e.g. cell antennas) to corresponding image data of path loss values over the map. The training data may comprise respective pairs of input and output, where the input is a map of the area of interest including the placement of transmission points (and potentially other data such as building location, etc), and the output is the corresponding radio path loss map image generated by conventional techniques (e.g. direct measurement or radio simulation models).

Figure 1:
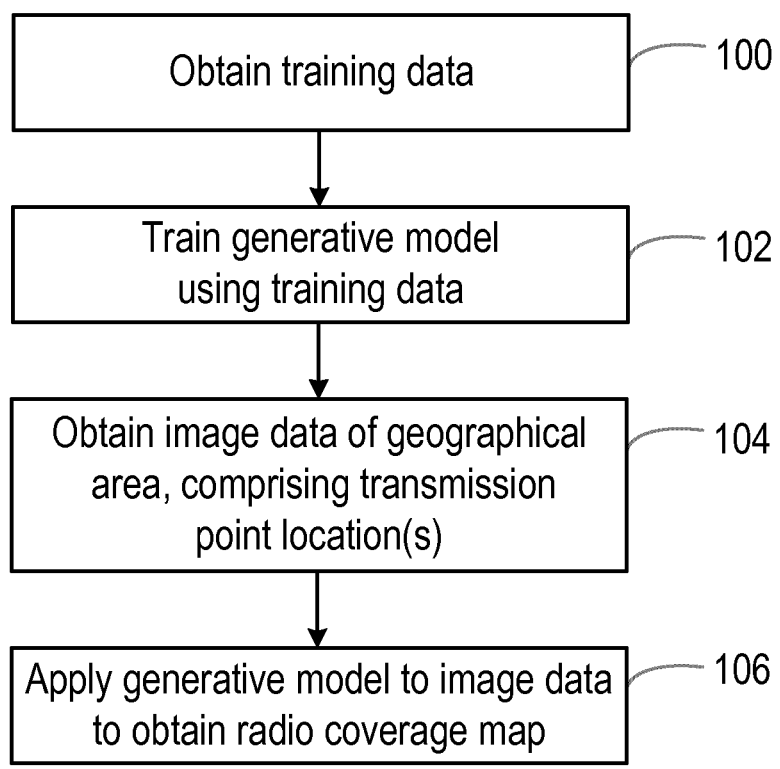
FIG. 1 is a flowchart of a method according to embodiments of the disclosure.

FIG. 1 is a flowchart of a method according to embodiments of the disclosure.

The method begins in step 100, in which training data is obtained, and continues in step 102 in which a generative model is trained using the training data.

According to embodiments of the disclosure, the generative model may implement or comprise a neural network. In particular embodiments of the disclosure, the generative model may comprise generative adversarial networks (GANs). The GANs may be conditioned, as described below and with respect to FIG. 3, and may therefore be termed conditional GANs (cGANs).

The purpose of steps 100 and 102 is to train the generative model to generate radio coverage maps based on any given image data of a geographical area, and any given antenna location(s) within that geographical area. Thus the training data may comprise an input of image data of a plurality of geographical areas and transmission point location(s) within those geographical areas, and a target of corresponding radio coverage maps for those image data.

The image data comprises a representation of the environment in the geographical area, and an indication of one or more transmission point locations within the geographical area.

The image data may further comprise indications of different types of object in the geographical area, particularly where those objects affect radio signal strength. For example, the image data may comprise indications of buildings, trees, or other structures at various locations within the geographical area. These indications may be encoded within the image data by taking predefined values according to the type of object represented, e.g., 1: building, 2: tree, 3: road, etc. The height of each object or each location may also be encoded within the image data. It will be noted that, where a particular location does not have an object, the ground height may nonetheless be indicated in this way.

It was noted above that the image data comprises an indication of one or more transmission point locations. A transmission point may correspond to an antenna of a radio access network, for example. The image data may comprise further information concerning the transmission points. For example, the image data may comprise one or more of: transmission power, transmission frequency, beam direction, beam width, and transmission point height.

The targets of the training data (i.e. the radio coverage maps) may be generated by either or both of the conventional methods described above. That is, the radio signal strength may be measured by a suitable device (e.g. a user equipment, UE) being physically moved between locations on the geographical area and measuring the radio signal strength at each location. Alternatively, the radio signal strength may be determined on the basis of radio propagation models. According to these methods, the radio coverage map is produced on the basis of the configuration of transmission points, using radio simulators that incorporate well-defined radio propagation and path-loss models. As noted above, it is also possible to combine the two approaches, for example, by supplementing measured radio signal strength data with data generated using simulation models.

The training data may comprise radio coverage maps generated by any one or more of these methods.

The generative model may be trained in step 102 by analysing the inputs in the training data, and determining an optimal model which transforms the image data into its respective target (radio coverage map). The training process is iterative. Weights within the model are altered between each iteration, or between certain numbers of iterations, so as to improve the model and generate a more accurate radio coverage map (i.e. a radio coverage map which corresponds more closely to the target radio coverage map for any given image data). With each iteration, the generative model improves, until a radio coverage map can be produced for any given input image data.

The training process may or may not involve a stopping criterion. For example, it will be understood by those skilled in the art that the generative model may continue to improve with each iteration of the training process. Thus, the training process may be iterated a certain number of times (and, in practice, as many times as possible) in order to achieve a level of quality in the radio coverage maps generated by the model. Alternatively, the training process may be iterated until a stopping criterion is reached, such as a given quality of radio coverage map (i.e. a radio coverage map which matches the measured or simulated radio coverage map for given input image data to a certain degree).

Once trained, the generative model can be used to generate a radio coverage map for any input image data. Thus, in step 104, the method comprises obtaining image data of a geographical area. The image data may be provided in the same format as the training input data described above. Thus the image data may comprise a representation of the environment in the geographical area, and an indication of one or more transmission point locations within the geographical area. The image data may additionally comprise data relating to the types of object within the geographical area, and the configuration of transmission points.

The generative model may operate on the image data one transmission point at a time, or multiple (e.g., all) transmission points at a time. The latter is likely to be more computationally intensive, but involve fewer steps.

For example, in the former case, the generative model may generate path loss data for the geographical area for each transmission point in isolation, and then determine the received signal strength for a particular transmission point at each location on the map (e.g. by attenuating the signal transmitted by the particular transmission point by the determined path loss at each location). The serving cell for a particular location may be determined by determining the transmission point with the highest received signal strength at the location. The radio coverage map may be generated by illustrating the highest received signal strengths at each location. The received signal strength may be indicated using any suitable method, such as a colour coding for example.

In the latter case, the generative model may generate a radio coverage map directly, based on the image data.

The flowchart illustrated in FIG. 1 thus shows methods of training a generative model, and using that generative model for the generation of radio coverage maps. In different aspects of the disclosure, these methods may be provided in combination (e.g., as shown in FIG. 1) or separately. In the latter case, for example, a third-party provider may train a generative model based on training data as described above, and below with respect to FIG. 3, and provide that trained generative model to a network operator for use in generating radio coverage maps (e.g. based on the positions of one or more transmission points belonging to the network operator).

The method may be carried out in a radio coverage map generator, such as that described below with respect to FIG. 4, for example.

Figure 2:
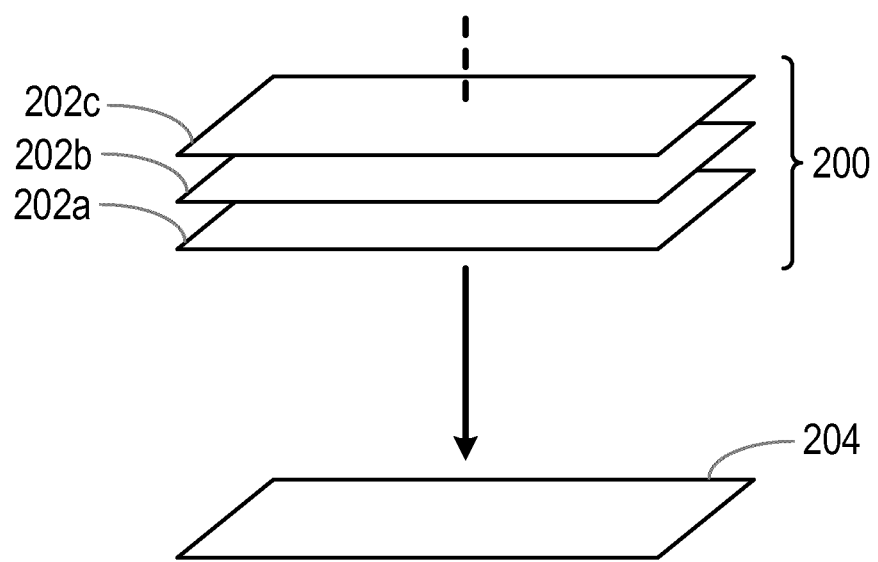
FIG. 2 is a schematic diagram of image data according to embodiments of the disclosure.

FIG. 2 is a schematic diagram showing the process of radio coverage map generation according to embodiments of the disclosure. Image data 200 for a given geographical area may comprise a plurality of layers 202a, 202b, 202c (collectively 202), with each layer comprising data on one or more given parameters. Each layer 202 may comprise a plurality of pixels, with each pixel corresponding to a given location within the geographical area. Corresponding pixels (i.e. pixels at the same location) within each layer then comprise data for that particular layer.

For example, a first layer 202a may comprise a representation of the environment of the geographical area. This may comprise image data of the geographical area. A second layer 202b may comprise transmission point information, such as transmission point location(s) and their respective configuration. Separate layers may be provided for each transmission point. A third layer 202c may comprise information concerning objects within the environment.

The generative model receives this image data 200 as input, and generates a corresponding radio coverage map 204 for the geographical area.

Figure 3:
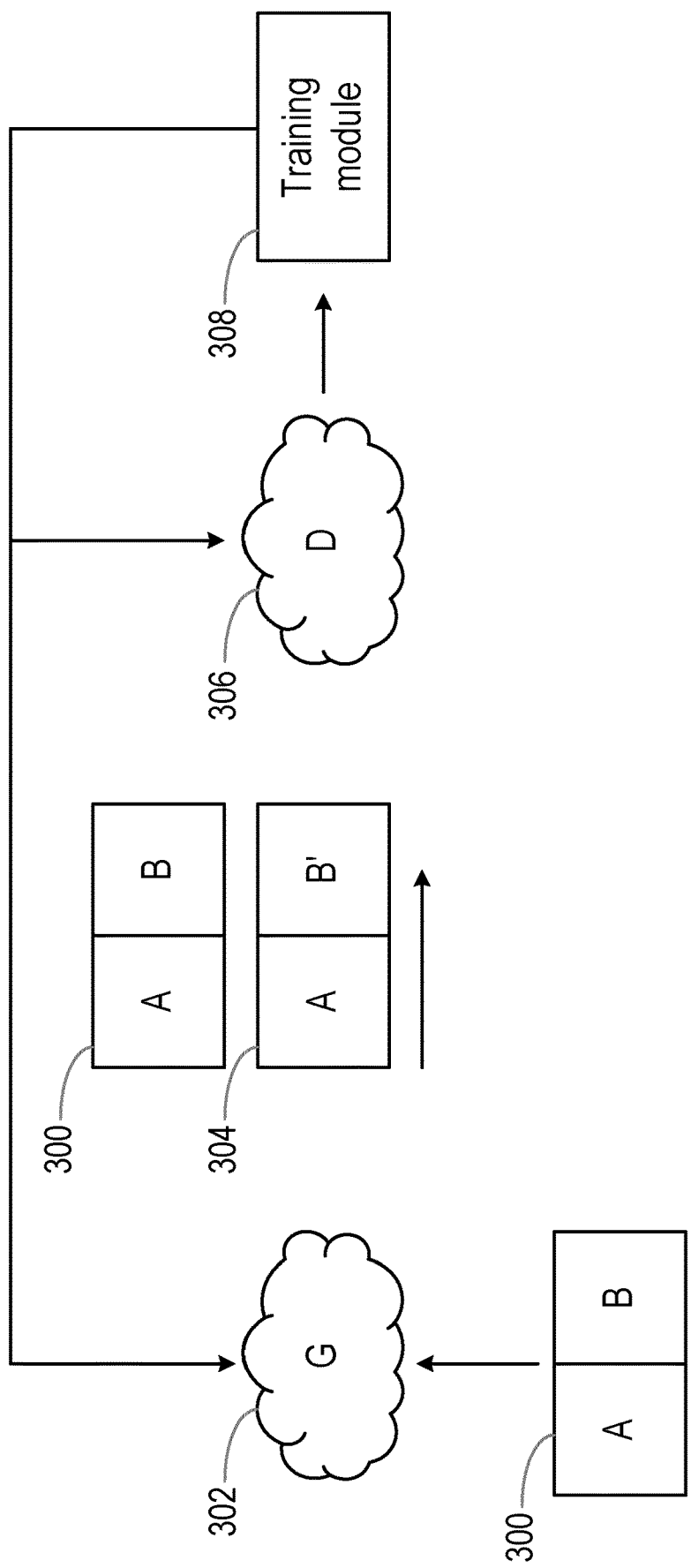
FIG. 3 is a schematic diagram showing training of a generative model according to embodiments of the disclosure.

FIG. 3 is a schematic illustration of a training process according to embodiments of the disclosure, where the generative model comprises conditional GANs.

GANs are known in the art, and are characterized by the use of two neural networks in competition with each other. Thus the GANs comprise a generator neural network 302 and a discriminator neural network 306. The generator network 302 is configured to generate "fake" data, based on some "real" input training data. The descriptors "real" and "fake" are used here to denominate training data (i.e. data obtained without use of the generator network 302) and data generated by the generator network 302. The goal of the generator network 302 is to generate "fake" data which closely mimics the training data. The goal of the discriminator network 306 is to discriminate between the real and fake data. If the discrimination is successful, the weights in the generator network 302 may be altered so as to improve the generation of fake data which more closely matches or resembles the real training data. If the discrimination is unsuccessful, the weights in the discriminator network 306 may be altered so as to improve that network's ability to discriminate between real and fake data. Each network improves its performance through repeated iterations until the discriminator network 306 is unable to discriminate between real and fake data.

In more detail, training data 300 is provided to the generator network 302. As described above, the training data comprises input image data (A) for a geographical area, and a target radio coverage map (B) for that image data. The generator network 302 uses the training data to generate fake data 304 for the same input A. Thus the fake data comprises the input image data A (the same image data as in the training data 300), and a generated radio coverage map B' for that image data.

Both real and fake data are provided to the discriminator network 306. The discriminator network 306 analyses the data provided to it, and determines in each case whether the target (the radio coverage map) is real, or generated by the network 302. It will be appreciated that, in practice, very many such data samples may be provided to the discriminator network 306 rather than just two as illustrated in FIG. 3.

The decisions of the discriminator network 306 are output to a training module 308, which knows whether particular data is real or not and can therefore determine whether the decisions of the discriminator network 306 are correct or not. The training module 308 then feeds this information back to the generator network 302 and the discriminator network 306, to allow those networks to adjust their weights accordingly and so improve their respective performance.

With each iteration of the training process, the performance of each network improves, until the generator network 302 produces "fake" data which is almost indistinguishable from real data. At the end of the training process, the generator network 302 may then be used as the trained generative model, to produce radio coverage maps for any input image data.

Figure 4:
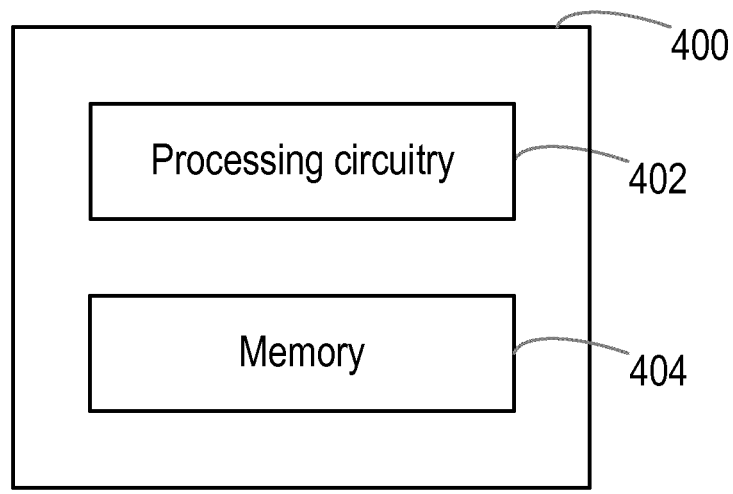
FIG. 4 is a schematic diagram of a radio coverage map generator according to embodiments of the disclosure.

FIG. 4 is a schematic diagram of a radio coverage map generator 400 according to embodiments of the disclosure.

The radio coverage map generator 400 comprises processing circuitry 402 (which may be any processor or combination of processors) and a non-transitory machine-readable medium 404 (such as memory). The machine-readable medium 404 is coupled to the processing circuitry 402, and stores instructions which, when executed by the processing circuitry, cause the radio coverage map generator 400 to: obtain image data of a geographical area; and apply a generative model to the image data, to generate a radio coverage map of the geographical area. The image data comprises: a representation of the environment in the geographical area; and an indication of one or more transmission point locations corresponding to the locations of one or more transmission points in a wireless communications network.

Figure 5:
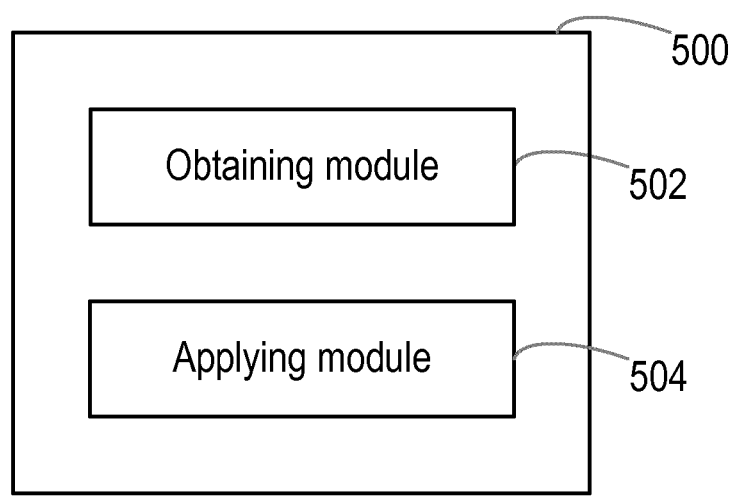
FIG. 5 is a schematic diagram of a radio coverage map generator according to further embodiments of the disclosure.

Alternatively, the radio coverage map generator may be implemented or embodied in one or more processing modules. FIG. 5 shows such a radio coverage map generator 500. The radio coverage map generator 500 comprises an obtaining module 502 and an applying module 504. The obtaining module 502 may be configured to obtain image data of a geographical area, the image data comprising: a representation of the environment in the geographical area; and an indication of one or more transmission point locations corresponding to the locations of one or more transmission points in a wireless communications network. The applying module 504 may be configured to apply a generative model to the image data, to generate a radio coverage map of the geographical area. In one embodiment, the modules are implemented purely in hardware. In another embodiments, the modules are implemented purely in software. In a yet further embodiment, the modules are implemented in a combination of hardware and software.

In some embodiments of the disclosure, the image data may comprise a plurality of pixels and a plurality of layers, each layer comprising, for each of the plurality of pixels, respective values for one or more parameters. One or more first layers of the plurality of layers may comprise the representation of the environment, and one or more second layers of the plurality of layers may comprise the indication of one or more transmission point locations. The one or more first layers may comprise respective predefined values for predefined types of object belonging to the environment in the geographical area. The one or more first layers may comprise values for the height of an object belonging to the environment in the geographical area.

The one or more second layers may further comprise, for each of the one or more transmission points, an indication of one or more of: a height of the transmission point; a direction of transmissions from the transmission point; a frequency of transmissions from the transmission point; and a power of transmissions from the transmission point.

The generative model may be trained on a set of training data comprising one or more of: image data of geographical areas and corresponding radio coverage maps acquired through measurement; and image data of geographical areas and corresponding radio coverage maps acquired through simulation based on one or more radio propagation models.

The generative model may comprise a neural network, such as generative adversarial networks. The generative adversarial networks may comprise a generating network and a discriminating network. The generative adversarial networks may be trained by: generating, using the generating network, based on training image data of a geographical area, a fake radio coverage map; determining, using the discriminating network, whether each of a plurality of training radio coverage maps is real or fake, the plurality of training radio coverage maps comprising the fake radio coverage map and at least one real radio coverage map; and updating the generating network and the discriminating network based on whether the determination by the discriminating network is correct or incorrect.

In embodiments of the disclosure, the radio coverage map comprises an indication of received signal strength over the geographical area. For example, the indicated received signal strength at a particular location may be the received signal strength associated with the transmission point having the highest received signal strength at the particular location.

The radio coverage map generator may be caused to apply the generative model to the image data to generate a radio coverage map by: for each of a plurality of transmission points in the wireless communications network, applying the generative model to image data comprising an indication of a single, first transmission point location of a plurality of transmission point locations corresponding to the location of a single, first transmission point of the plurality of transmission points to generate an intermediate radio coverage map in respect of the first transmission point; and combining the respective intermediate radio coverage maps to generate the radio coverage map.

Alternatively, the radio coverage map generator may be caused to apply the generative model to the image data to generate a radio coverage map by: applying the generative model to image data comprising an indication of a plurality of transmission point locations corresponding to the locations of a plurality of transmission points to generate the radio coverage map.

The present disclosure thus provides methods, apparatus and computer program products for generating radio coverage maps using a trained generative model. Radio coverage maps can thus be generated at considerably less expense than methods involving the direct measurement of radio signal strength in the field, and with higher accuracy than methods involving path loss simulation models.

The skilled person will thus recognise that some aspects of the above-described apparatus and methods, for example the calculations performed by the processor may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the disclosure will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A method of generating a radio coverage map, the method comprising:
obtaining image data of a geographical area, the image data comprising:
a representation of an environment in the geographical area;

an indication of one or more transmission point locations corresponding to locations of one or more transmission points in a wireless communications network; and a direction of transmissions from the one or more transmission points; and applying a generative model to the image data, to generate a radio coverage map of the geographical area, wherein the generative model comprises generative adversarial networks, and wherein the generative model is trained on a set of training data comprising image data of geographical areas and corresponding radio coverage maps acquired through simulation based on one or more radio propagation models.

2. The method according to claim 1, wherein the image data comprises a plurality of pixels and a plurality of layers, each layer comprising, for each of the plurality of pixels, respective values for one or more parameters.

3. The method according to claim 2, wherein one or more first layers of the plurality of layers comprise the representation of the environment, and wherein one or more second layers of the plurality of layers comprise the indication of the one or more transmission point locations.

4. The method according to claim 3, wherein the one or more first layers comprise respective predefined values for predefined types of object belonging to the environment in the geographical area.

5. The method according to claim 3, wherein the one or more first layers comprise values for a height of an object belonging to the environment in the geographical area.

6. The method according to claim 3, wherein the one or more second layers further comprise, for each of the one or more transmission points, an indication of one or more of:
a height of a transmission point;
a frequency of transmissions from the transmission point; and
a power of transmissions from the transmission point.

7. The method according to claim 1, wherein the generative model is trained on a set of training data further comprising:
image data of the geographical areas and the corresponding radio coverage maps acquired through measurement.

8. The method according to claim 1, wherein the generative adversarial networks comprise a generating network and a discriminating network, and wherein the generative adversarial networks are trained by:
generating, using the generating network, based on training image data of the geographical area, a fake radio coverage map;
determining, using the discriminating network, whether each of a plurality of training radio coverage maps is real or fake, the plurality of training radio coverage maps comprising the fake radio coverage map and at least one real radio coverage map; and
updating the generating network and the discriminating network based on whether the determination by the discriminating network is correct or incorrect.

9. The method according to claim 1, wherein the radio coverage map comprises an indication of received signal strength over the geographical area.

10. The method according to claim 9, wherein the indicated received signal strength at a particular location is the received signal strength associated with a transmission point having the highest received signal strength at the particular location.

11. The method according to claim 1, wherein applying the generative model to the image data to generate the radio coverage map comprises:
for each of a plurality of transmission points in the wireless communications network, applying the generative model to image data comprising an indication of a single, first transmission point location of a plurality of transmission point locations corresponding to a location of a single, first transmission point of the plurality of transmission points to generate an intermediate radio coverage map in respect of the first transmission point; and
combining respective intermediate radio coverage maps to generate the radio coverage map.

12. The method according to claim 1, wherein applying the generative model to the image data to generate the radio coverage map comprises:
applying the generative model to image data comprising an indication of a plurality of transmission point locations corresponding to the locations of a plurality of transmission points to generate the radio coverage map.

13. A radio coverage map generator, comprising:
an obtaining module configured to obtain image data of a geographical area, the image data comprising:
a representation of an environment in the geographical area;
an indication of one or more transmission point locations corresponding to locations of one or more transmission points in a wireless communications network; and
a direction of transmissions from the one or more transmission points; and
an applying module configured to apply a generative model to the image data, to generate a radio coverage map of the geographical area, wherein the generative model comprises generative adversarial networks, and
wherein the generative model is trained on a set of training data comprising image data of geographical areas and corresponding radio coverage maps acquired through simulation based on one or more radio propagation models.

14. The radio coverage map generator according to claim 13, wherein the image data comprises a plurality of pixels and a plurality of layers, each layer comprising, for each of the plurality of pixels, respective values for one or more parameters.

15. The radio coverage map generator according to claim 14, wherein one or more first layers of the plurality of layers comprise the representation of the environment, and wherein one or more second layers of the plurality of layers comprise the indication of the one or more transmission point locations.

16. The radio coverage map generator according to claim 13, wherein the generative model is trained on a set of training data further comprising:
the image data of the geographical areas and the corresponding radio coverage maps acquired through measurement.

17. The radio coverage map generator according to claim 13, wherein the generative adversarial networks comprise a generating network and a discriminating network, and wherein the generative adversarial networks are trained by:
generating, using the generating network, based on training image data of the geographical area, a fake radio coverage map;
determining, using the discriminating network, whether each of a plurality of training radio coverage maps is real or fake, the plurality of training radio coverage maps comprising the fake radio coverage map and at least one real radio coverage map; and updating the generating network and the discriminating network based on whether the determination by the discriminating network is correct or incorrect.

18. The radio coverage map generator according to claim 13, wherein the radio coverage map comprises an indication of received signal strength over the geographical area.

19. The radio coverage map generator according to claim 18, wherein the indicated received signal strength at a particular location is the received signal strength associated with a transmission point having the highest received signal strength at the particular location.

20. The radio coverage map generator according to claim 13, wherein the applying module is configured to apply the generative model to the image data to generate the radio coverage map by:

for each of a plurality of transmission points in the wireless communications network, applying the generative model to image data comprising an indication of a single, first transmission point location of a plurality of transmission point locations corresponding to a location of a single, first transmission point of the plurality of transmission points to generate an intermediate radio coverage map in respect of the first transmission point; and combining respective intermediate radio coverage maps to generate the radio coverage map.

* * * * *